United States Patent [19]

Michaud-Soret

[11] Patent Number: 4,659,056
[45] Date of Patent: Apr. 21, 1987

[54] ELECTRICALLY HEATED LIGHT-WEIGHT CONCRETE MOLD

[75] Inventor: Jean A. Michaud-Soret, Paris, France

[73] Assignee: Societe Nationale Industrielle et Aerospatiale, France

[21] Appl. No.: 651,609

[22] Filed: Sep. 17, 1984

[30] Foreign Application Priority Data

Sep. 19, 1983 [FR] France ............... 83 14838

[51] Int. Cl.⁴ ............................................. B29C 33/02
[52] U.S. Cl. ........................................ 249/78; 249/111; 249/134; 249/160
[58] Field of Search ............... 106/38.27, 38.3, 97; 249/78–80, 111, 134, 135, 160; 264/257, DIG. 46, 337, 338; 425/DIG. 13

[56] References Cited

U.S. PATENT DOCUMENTS

| | | | |
|---|---|---|---|
| 2,135,380 | 11/1938 | Benge | 264/257 |
| 2,175,208 | 10/1939 | Lougheed | 264/257 |
| 2,317,597 | 4/1943 | Ford et al. | 264/DIG. 46 |
| 2,907,070 | 10/1959 | Van Hartesveldt | 249/80 |
| 3,173,175 | 3/1965 | Lemelson | 249/79 |
| 3,185,432 | 5/1965 | Hager | 249/78 |
| 3,326,273 | 6/1967 | Jago et al. | 106/38.27 |
| 3,420,981 | 1/1969 | Martinet | 249/78 |
| 3,475,265 | 10/1969 | Santry | 264/225 |
| 3,932,096 | 1/1976 | Kartman | 249/79 |
| 4,126,470 | 11/1978 | Braun et al. | 106/97 |
| 4,225,109 | 9/1980 | Yotsutuji et al. | 249/111 |
| 4,252,193 | 2/1981 | Powers et al. | 106/97 |
| 4,496,131 | 1/1985 | Yang | 249/78 |

FOREIGN PATENT DOCUMENTS

| 2050733 | 4/1972 | Fed. Rep. of Germany | 249/78 |
|---|---|---|---|
| 2319289 | 11/1974 | Fed. Rep. of Germany | 249/78 |

Primary Examiner—Willard E. Hoag
Attorney, Agent, or Firm—McGlew and Tuttle

[57] ABSTRACT

A mold having a concrete base and a mold cavity member lined with sheet metal. Adjacent the sheet metal are electric heating means and between the electric heating means and the concrete base is a light-weight concrete insulating layer.

4 Claims, 6 Drawing Figures

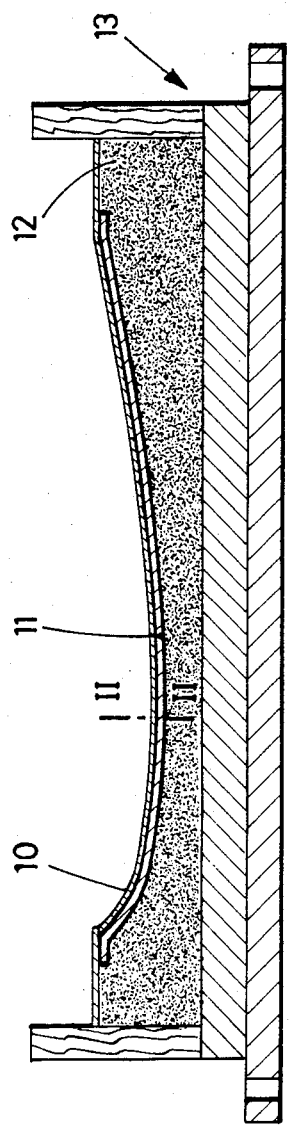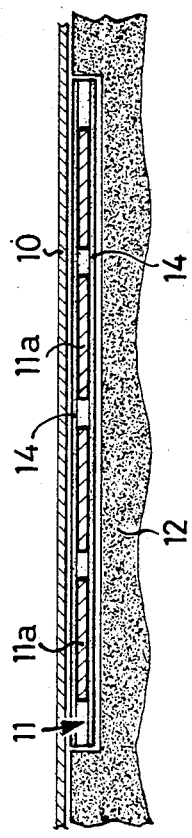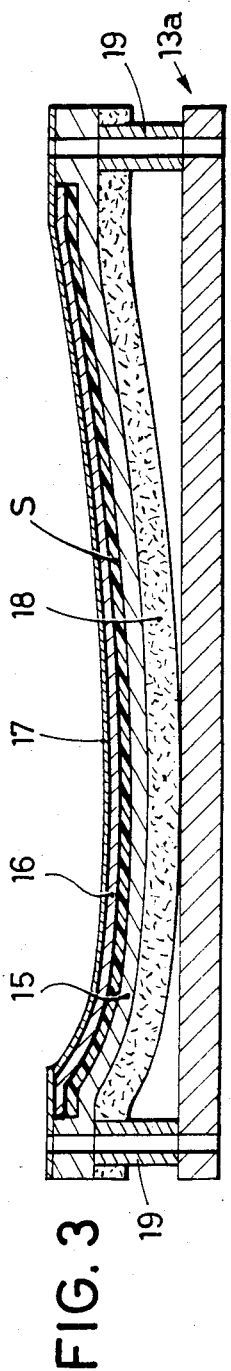

ELECTRICALLY HEATED LIGHT-WEIGHT CONCRETE MOLD

The present invention generally relates to the manufacture of molded parts of large size and it more particularly relates to a method for manufacturing a cheap mold for articles of large size and of a composite material which is polymerizable under heat and pressure.

Composite materials based on resins and fibers have undergone considerable development in many applications owing to their intrinsic qualities: strength, stability, insensitive to corrosion and other well-known properties among which in particular the ease of manufacture by molding and polymerization by application of heat and pressure.

However, the manufacture of articles of large size from resins reinforced with fibers has only been possible up to the present time with manual methods in which one or more operators deposit layers, for example of glass fabric, by impregnating them as work proceeds with layers of resin, on a form or die, the polymerization being achieved solely by the addition of a catalyst to the resin, owing to the fact that the uniform application of pressure and heat is extremely difficult on parts of large size. This method is time-consuming and has moreover the drawbacks of polymerization by exothermic reaction.

In order to produce parts of reinforced resin polymerized by application of heat and pressure, there must be used rigid molds having passageways for the circulation of a heating agent.

Such molds are extremely expensive to produce and mainly the cost involved in this manufacture has up to the present time rendered the manufacture of articles of large size, for example beams of composite material polymerized by application of heat and pressure, impossible, although the qualities of these materials are of particular interest in this application and in many other applications.

An object of the invention is to overcome this drawback and to provide a method for manufacturing a mold for producing articles of large size of reinforced resin by molding under heat and pressure The invention therefore provides a method for manufacturing a mold for producing molded parts of large size and of composite material polymerized by application of heat and pressure, said method comprising forming a wall of a molding cavity in a plurality of parts of a cheap material having a high thermal conductivity, applying heating means in direct thermal exchange relation to the external surface of said wall of the cavity, applying a thermal insulator on top of said heating means and fixing the various parts of the wall on rigid mold-supports in uniform pressure transmission relation to said wall.

It will be understood that as the thermal insulator constitutes a barrier, the heat generated by the heating means is entirely applied to the composite material located in the mold cavity through the conductible wall of the mold, this heat acting jointly with the pressure applied to the mold-supports and permitting the obtainment of the desired polymerization of the material.

According to another feature of the invention, the heating means applied to the exterior of said cavity wall are interchangeable flexible elements.

According to one embodiment, the cavity wall is made from a thin sheet carried by a rigid and uncompressible mold-support of an insulating material, said heating elements being interposed between said material and said wall in a detachable manner.

According to another embodiment of the invention, said cavity wall is formed by a rigid thick sheet of metal which itself ensures the transmission of the molding pressure.

The invention also provides a mold for molding parts of large size of resin reinforced with fibers and polymerized by application of heat and pressure, produced by the aforementioned method.

The invention further provides a structure of large size of resin reinforced with fibers and polymerized by application of heat and pressure, said structure being produced by means of the mold defined hereinbefore and comprising, as the case may be, heating elements incorporated within the mass in the known manner.

The following description, with reference to the accompanying drawings which are given merely by way of examples, will explain how the present invention may be carried out.

FIG. 1 is a sectional view of one half of a mold section according to a first embodiment of the invention.

FIG. 2 is a sectional view, to an enlarged scale, taken on line II—II of FIG. 1.

FIGS. 3 and 4 are views similar to FIG. 1 of two other embodiments of the invention.

Figure 4:
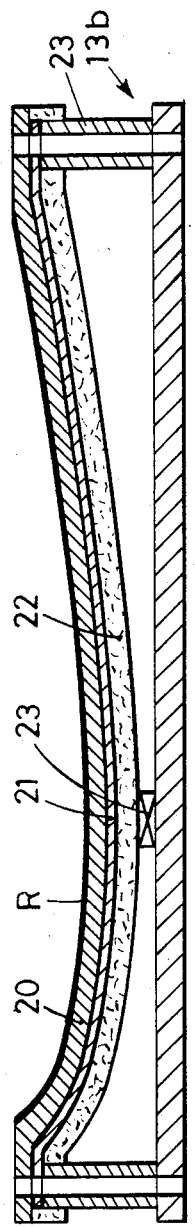

Molds employed for molding parts generally comprise two semi-shells which are generally identical. Only the shell of lower half of a mold element according to the invention has been described and shown in the various figures of the drawing.

The mold half shown in FIG. 1 comprises a mold cavity wall 10 which is formed in this embodiment by a thin metal sheet which has been shaped by any suitable method, for example by a conventional sheet metal working method.

The metal sheet 10 has on its outer surface opposed to the molding cavity heating means formed by elements 11 of a known type which are spaced along the length of the mold element and these elements are held in position by a mass 12 of a hard thermally insulating synthetic foam material capable of transmitting a uniform pressure throughout the entire surface of the assemblage formed by the mold cavity wall 10 and the heating elements 11.

The foam block 12 is preferably disposed in a frame generally designated by the reference 13 and connected to the ground and therefore undeformable as concerns straightness and twist.

It will be understood that the heating elements 11 are consequently in direct thermal exchange relation to the thin sheet metal 10 constituting the wall of the molding cavity and that the mass of foam 12 constitutes a thermal barrier so that the heat produced by the heating elements 11 is entirely directed toward the interior of the molding cavity through the thin sheet 10 whose thermal conductivity is high. This mass of foam permits a limitation of the power required for the polymerization which is therefore effected on the spot with no need to employ a heating furnace or an oven.

FIG. 2 shows to an enlarged scale the arrangement of a heating element 11 between the mass of foam 12 and the cavity wall 10.

Each heating element 11 comprises in the known manner an electric resistance element formed for example by a thin strip of metal 11a disposed in a continuous sinuous path between two sheets 14 of a fibrous material, for example glass fabric, which are adhered by means of a polymerized synthetic resin.

The principle of these heating elements is known. They may be manufactured rapidly and cheaply to any size and with known values of resistance, in particular by peans of sheets of a suitable synthetic material on which are disposed adhesive strips or bands containing lead.

These elements, or resistances, have the advantage of a very large thermal exchange area. They are supplied with a suitable electric power and their temperature is controlled.

The thermally insulating foam 12 may be directly poured onto the heating elements and onto the rear surface of the molding cavity wall 10 and subsequently cut to shape so as to enter the support 13.

It may also be made in the form of a block and worked upon so as to assume a shape corresponding to that of the mold cavity wall 10.

The heating elements are so spaced apart as to distribute the heat along the length of the mold cavity wall in a roughly uniform manner.

According to the embodiment shown in FIG. 3, the mold according to the invention is produced by means of a form or mold-support 15 of rigid and thick sheet metal which was previously machined or shaped so as to have the desired shape. Disposed on the inner wall of this thick sheet is a layer S of a glass fiber/resin laminate which receives in a detachable manner the heating elements 16 on which a mold or form of thin sheet metal 17 is placed. This arrangement ehables the heating elements to be repaired or replaced. A thermally insulating foam 18 of low-density plastics material which constitutes the thermal barrier is applied on the outer surface of the mold-support 15 of thick sheet metal.

In this embodiment, the mold-support 15 of thick sheet metal has a certain thermal inertia which is taken advantage of for achieving an improved distribuiion of the heat given off by the heating elements 16. Also, in this embodiment, the mold part is mounted on a frame 13a for example by means of spacer elements 19.

In the embodiment shown in FIG. 4, the mold cavity wall is formed directly by a thick approximately-machined sheet metal 20, the suitable profile being imparted thereto by a layer R of resin with a metal powder filler, for example aluminum.

Applied on the external surface of the sheet metal 20 are the heating elements 21 on which is applied a layer 22 of a thermally insulating and low-density foam which acts as a thermal barrier. In this embodiment, the mold cavity wall of thick sheet metal 20 also constituted the mold-support. It is fixed to the frame 13b by means of spacer elements 23.

Figure 5:
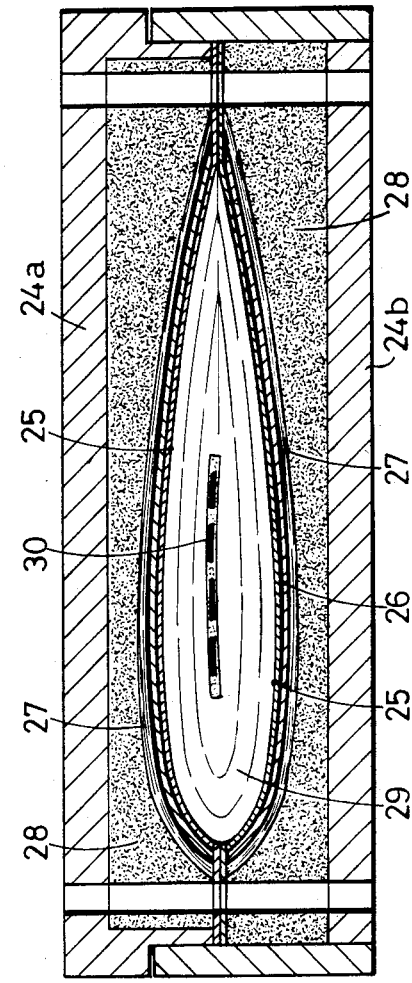
FIG. 5 is a cross-sectional view of a mold according to the invention in which a blade of a wind-engine is molded.

Shown in FIG. 5 is a complete mold comprising an upper half 24a and a lower half 24b in which the mold cavity wall is formed by a thin sheet metal 25 on the external surface of which are disposed heating elements 26, the mold-support being formed by a stack or superposition 27 of layers of glass fabric previously impregnated with resin and disposed in a rigid highdensity insulating foam block 28 which was previously machined to the desired shape. The part molded in this mold is advantageously produced by means of a plurality of layers of the pre-impeegnated semi-product, for example, that disclosed in the French patent application No.° 81 19706 of the applicant which are generally designated by the reference 29 and in the middle of which are disposed heating elements 30 which are preferably disposed in the non-polymerized state between the layers 29, these heating elements 30 being simultaneously supplied with power with the heating elaments 26 and with the application of pressure. These heating elements 30 are finally incorporated within the material of the molded part with which they become completely integral.

Figure 6:
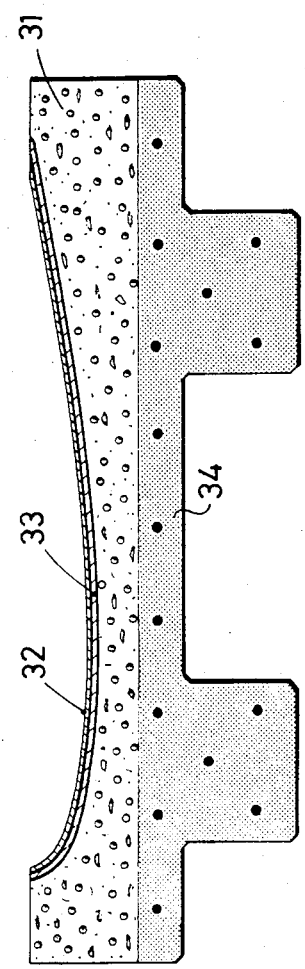
FIG. 6 is a sectional view of a modification of a mold part according to the invention.

FIG. 6 shows another embodiment of a mold according to the invention in which the mold-support is constituted by a mass 31 of lightened concrete having a filler of cellular glass balls and microspheres of glass having a density of between 0.3 and 0.7 so as to impart to this concrete high thermally insulating properties while allowing this concrete to have the rigidity required for uniformly transmitting the pressure over the thin sheet metal 32 constituting the mold cavity wall. The mass of lightened concrete 31 may be easily made to the required shape so as to constitute the mold-support and, after its setting, it is capable of uniformly transmitting the pressure to the thin sheet metal 32 while forming a suitable thermal barrier with respect to the heat given off by the heating elements 33. The mass 31 of cellular concrete is advantageously supported by a support 34 of reinforced concrete. Such a mold ensures a very high reliability in the manufacture of structural parts of large size since such a lightened concrete has no interstice or air bubble.

In all the embodiments described hereinbefore there is of course employed in the known manner a suitable mold-stripping agent so as to avoid any adherence of the composite material to the mold cavity wall.

It will be understood that the invention permits the cheap production of molds for producing parts of composite material of large size and in a plurality of elements which may be easily adapted to be assembled one after the other and on which it is possible to apply pressure-transmitting means, while the heating elements transmit their heat directly through the conductive wall of the mold cavity and that, optionally, heating elements incorporated within the material of the molded part ensure a uniform heating of the composite material so as to polymerize the latter.

It will be observed that the molds produced in accordance with the invention jointly with the semi-product such as that described in the French patent application No.° 81 19706 of the applicant, which is nonpolymerized or partly polymerized permit the heretofore impossible production of parts of large and even very large size, the aforementioned semi-product resulting in an extremely large saving in time in the course of the disposition of the various layers of the composite product in the molding cavities.

What is claimed is:

1. A concrete mould with heating elements for producing moulded pieces with large dimensions, particularly great length, of a composite material, the concrete mould comprising: a reinforced concrete support: a mass of lightened thermally insulating concrete, adjacent to and supported by said reinforced concrete support, including a filler of cellular glass balls and glass microspheres divided within said thermally insulating concrete, the thermally insulated concrete having an inner surface with an impression shape contour of the piece to be moulded; a plurality of electrical resistence heating elements on said surface; and, a thin sheet metal layer over said elements, said thin sheet metal extending along the contour of said impression shape.

2. A concrete mould claimed in claim 1, wherein: said electrical resistance heating elements comprised thin adhesive strips of lead disposed in a continuous sinuous path between two sheets of a fibrous material which are adhered by means of a polymerized synthetic resin.

3. A concrete mould as claimed in claim 2, wherein: said heating elements are arranged in direct thermal exchange relationship with said surface of said thermally insulating concrete and with said thin sheet metal layer in a moveable manner.

4. A concrete mould as claimed in claim 1, wherein: said mass of thermally insulating concrete has a compressed density between 0.3 and 0.7.

* * * * *